Patented May 14, 1935

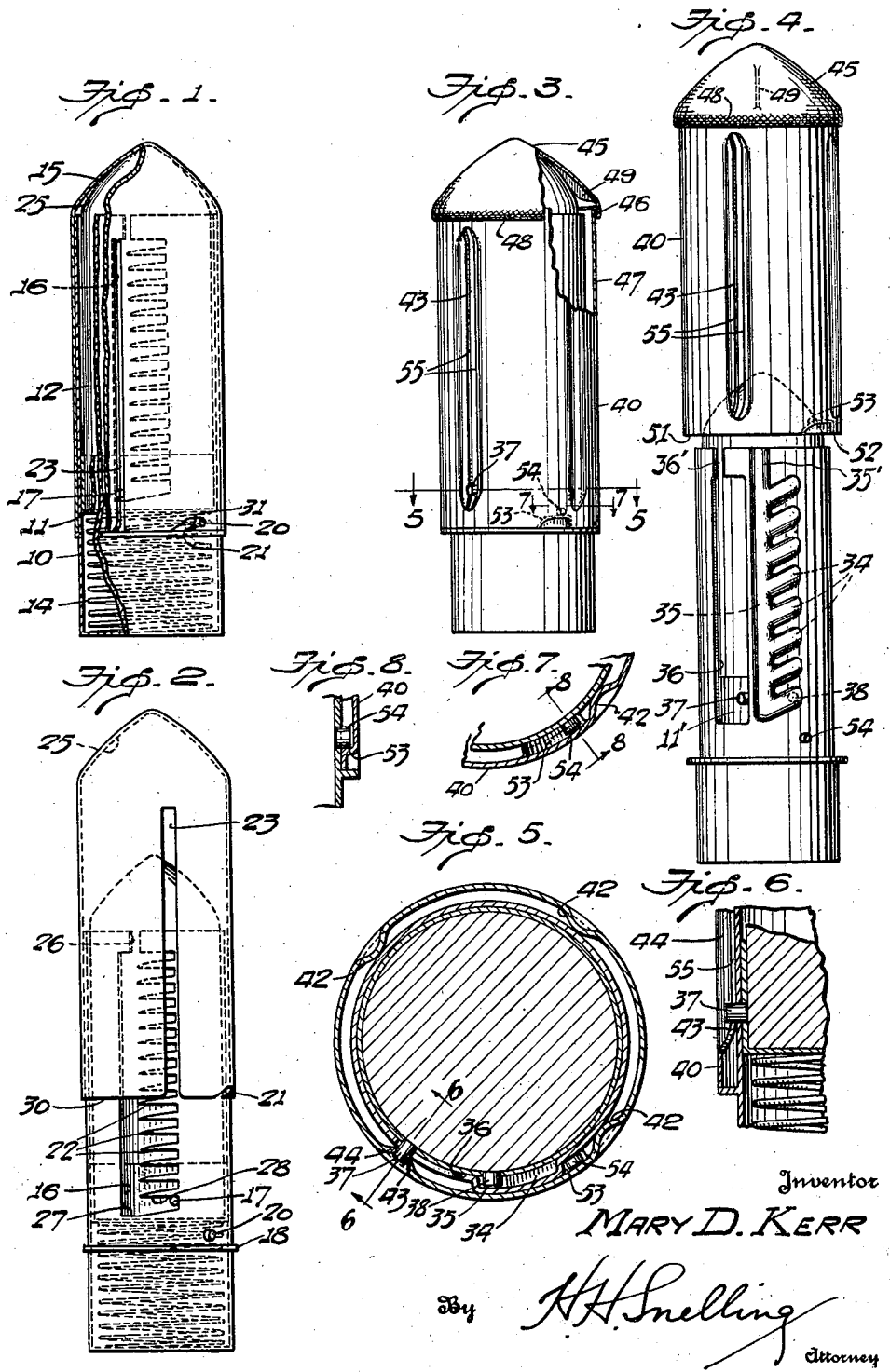

2,001,464

UNITED STATES PATENT OFFICE 2,001,464

CONTAINER

Mary D. Kerr, Columbia, S. C.

Application January 22, 1934, Serial No. 707,826

20 Claims. (Cl. 206—56)

This invention relates to containers for sticks, usually plastic, such as cosmetic material such as lipsticks, menthol sticks, shaving soap sticks, and the like. The principal object of the invention is the provision of a container which automatically exposes the stick a predetermined amount as it wears away.

Another object is the provision of a container which cooperates with its cover to keep the end of the stick pointed or otherwise shaped at all times.

Still another object of the invention is to provide an automatic container which not only automatically propels the lipstick but also prevents it retreating into the container when in use.

Most lipstick containers on the market today are so constructed that the user must push or twist the stick out of the casing the desired amount for applying the same. It is also found necessary to sharpen the stick and this procedure often consists in whittling or rubbing the end with the thumb nail or rubbing the stick on the wall or any other convenient surface with the result that not only a large amount of the stick is wasted but the thumb nail, wall or other surface used, is left in a very untidy condition. My container obviates the adjusting of the exposed length of stick as well as shaping of the same.

In the drawing:

Figure 1 shows the assembled container partly broken away.

Figure 2 shows the container with the cover partly removed.

Figure 3 illustrates a modification, partly broken away.

Figure 4 shows the modified form with the cover removed.

Figures 5 to 8 are sectional views taken on lines 5—5, 6—6, etc. in Figures 3, 5 and 7.

Referring particularly to Figure 1, the assembled container is shown as consisting of a main body 10, a stick holder 11, a stick or filler 12, a spring 14 and a cover 15. The stick holder 11 may consist of a simple band, the edge of which engages the spring, but is preferably a cup-like member. The main body or casing 10, as shown best in Figure 2, is provided with a vertical slot 16 for receiving a pin 17 fixed to the holder 11, and has a stop member 18 a short distance below the bottom of the slot. The stop member may consist of two or more projections distributed about the casing but preferably consists of an annular ledge or flange formed either by a separate ring fixed thereto or by a fold or crimp in the casing wall. A cover locking pin 20 may be provided at almost any point around the container near the ledge 18, its location determining the location of the slot or groove 21 in the cover with which groove the pin cooperates to lock said cover in position down against the stop member 18. It will be noted that the groove or slot 21 has approximately the same slight pitch or slant and points in the same direction as the teeth 22 in the edge of the vertical slot 16. There is also provided in the cover 15 a vertical slot or groove 23 with which the pin 17 cooperates in the locking and unlocking operations of the holder. The inside surface of the top of the cover may be given any desired shape but is preferably shaped as shown at 25 in order to give the lipstick a pointed shape when turned against it. A relatively narrow slot or groove 26 is provided at the top of slot 16 so as to permit the removal and insertion of the holder 11.

The operation of the device is as follows: A stick or filler 12 is inserted in the holder 11 and both placed in the casing 10 on top of the fully extended spring 14. The cover is then placed over the protruding stick with the slot 23 turned so as not to go over the pin 17, i. e., so that the lower edge of the cover strikes the pin. Pressure on the cover will force the holder downward until the pin strikes the lower end 27 of the slot 16 and while holding the parts in this relation the pin may be pushed around under the lower tooth 28 by means of the thumb nail or the edge of a tool. The operation thus far described is that found best for inserting the filler for the first time or for inserting a refill and the following description refers to the general operation of the container while in use.

The filler being in place the cover is then turned until the pin 17 engages the slot 23 which allows the lower edge 30 to move toward the stop member 18 and, at the same time, guides the lock-pin 20 into the groove or slot 21. A right turn of the cover with respect to the body 10 now accomplishes two results, that is, it causes the edge 30 to be drawn down against the ring 18 to lock the cover in place and at the same time moves the pin 17 from under the tooth 28 to unlock the holder permitting the spring to push the lipstick up against the surface 25 of the locked cover. When it is desired to use the stick the cover is turned to the left which movement does three things: it brings the pin 17 under an adjacent tooth, rubs the shaping surface 25 against the end of the stick and releases the cover from the lock pin 20. It is to be noted that because of the downward slope of the upper camming surface of the teeth the releasing movement of the cover cams the stick upward more firmly against the shaping surface 25 so that the slight turning has the desired shaping effect on the end. In order to increase this shaping effect the teeth and slot 31 may be made longer and the latter may have a level portion 31 near the end.

In the modification illustrated in Figures 3 and 4 internal grooves 34 have been substituted for the teeth 22 and a vertical internal groove 35 takes the place of vertical slot 16 (see Figure 4), but a vertical slot 36 is necessary for exposing the pin 37 on the holder 11' for engagement with the cover. A second pin 38 performs the same functions as pin 17 in the first described form except that it does not engage the cover 40, this function being taken care of by the pin 37. The groove 35 and slot 36 may be located on diametrically opposite sides of the body so that a single pin extending thru the holder may be used in which case the projections 37 and 38 are at opposite ends. I find however, that this construction requires greater care in making than usual manufacturing costs permit. The arc covered by the grooves 34 is substantially the same as the arc covered by the slot 36 because the freedom of angular movement of the pins 37 and 38 should be about the same. See Figure 5 which shows the arcs to be nearly equal. In order to accommodate the struck up grooves 34 and 35 the cover 40 is given a greater inside diameter than would otherwise be necessary and is then fluted as at 42 and the edges of the slot 43 are at the bottom of one of these flutes 44. Another feature of the second modification is the provision of a shaping top 45 rotatably joined at 46 to the sleeve 47 of the cover. The top may be knurled as at 48 to provide a better finger hold for turning the top. In some cases it may be desirable to provide an extra shaping means on the inside of the top which means may take the form of a rounded boss or of a fin such as shown at 49 the thickness of the fin depending on the plasticity of the stick to be shaped, i. e., being broad for soft sticks and thin for hard sticks.

The groove 35 continues at 35' to the upper edge of the body and similarly slot 36 is provided with a slot 36' altho this likewise may be a groove. These two grooves accommodate the pins 37 and 38 to permit the removal and insertion of the holder when this is found necessary for the renewal of a lipstick. The lower edge 51 of the cover may be turned in slightly at 52 to provide a camming surface 53 for engaging the pin 54 to lock the cover in place as this construction takes the place of a slot and provides a guard over the pin 54 when the stick is not in use. Obviously the surface 53 as well as the surfaces 55 of the slot could be provided by adding metal to the inside of the cover so that the outside presents a smooth unbroken surface.

The operation of the second modification is the same as that described above except that the rotating top 45 permits the easy shaping of the stick and independently of the movement occurring during the locking and unlocking of the stick.

Both modifications are preferably stamped from sheet metal because of economy in forming the slots, flutes and grooves, however it is obvious that the invention may be carried out by machining, carving or molding, the method depending upon the material chosen.

What I claim is:

1. A lipstick container comprising a casing for reciprocably receiving a lipstick, a spring for urging the stick outward, means for preventing the outward movement, said means including a member carried by the stick, and a cover reciprocably receivable by said casing, the proximate surfaces of the casing and cover being substantially cylindrical whereby the casing and cover are relatively rotatable, a projection on one of said surfaces and a transverse slot in the other whereby said cover is rotatable into and out of locking engagement with the casing, said cover adapted to engage said member for releasing the preventing means when locked on the casing by rotation in one direction and for locking the preventing means when unlocked from the casing by rotation in the opposite direction.

2. The device of claim 1 in which the cover is pointed at the top and the lipstick engages the inner surface of the top whereby said rotation of the cover shapes the end of the lipstick.

3. A container for cosmetic sticks or the like, comprising a casing for receiving a stick, spring means for urging the stick outward, locking means for preventing outward movement of the stick, means having engagement with the casing and movable thereon to engage and release the locking means whereby to permit the stick to move outward and a cap for engaging the end of the stick and stopping its outward movement, said cap being rotatable and having an inner stick-shaping means whereby when the cap is rotated the end of the stick is shaped for use.

4. A container for plastic sticks comprising a cylindrical casing for receiving a plastic stick, a spring for urging the stick outward, means adapted to move with the stick and cooperating with the casing for preventing the outward movement, and a cover having telescoping engagement with said casing the proximate surfaces of the casing and cover having interlocking configurations whereby said cover has locking engagement with the casing when rotated with respect thereto in one direction, and also having engagement with said means when so rotated to release the same to allow the stick to move outward into abutment with the inside surface of the cover.

5. The device of claim 4 in which the top of the cover has a stick shaping inner surface and is rotatable with respect to the lower portion whereby while said cover is locked in position on the casing the top may be rotated to shape the end of the stick.

6. The device of claim 4 in which the cover consists of a sleeve, a top rotatably connected to the sleeve and means on the inner side of the top for engaging and shaping the stick.

7. A container for plastic sticks comprising a body having a cylindrical bore for receiving a stick, a spring in the bottom of said bore, a cylindrical sleeve slidable in the bore for holding the base of a stick, a cover for telescoping over the body, said sleeve being urged outward by said spring, a projection on said sleeve, said body having vertically spaced substantially horizontal camming surfaces for engaging said projection to hold the stick at a desired level in the body, means engageable by the cover for moving the sleeve to bring the projection into or out of engagement with said surfaces whereby the stick may be locked by the removal of the cover and unlocked by application of the cover.

8. A container for plastic sticks, comprising a body having a cylindrical bore, the wall of said bore having a vertical slot therein, a cover for telescoping over a portion of the body, a stick holder loosely slidable in said bore, a projection on the holder for engaging in said slot, teeth in one edge of the slot, means on the cover and movable in an arc adjacent said wall for engaging said projection to bring it into and out of engagement with the teeth for locking and unlocking the stick and spring means in the bottom of the bore for urging said holder outward.

9. A container for cosmetic sticks, comprising a cylindrical casing, a compression spring in the casing, said casing having a vertical slot and a vertical inner groove in its cylindrical wall and having vertically spaced substantially horizontal grooves leading from said vertical groove, a cup-like holder rotatable and slidable in the casing and resting on said spring, a first projection on the holder for engaging in said grooves, a second projection on the holder for engaging in the slot, a top for said casing, a sleeve rotatably connected to the top and slidable on the casing, and means on the sleeve for engaging the second projection whereby rotation of the sleeve in one direction causes rotation of the cup-like holder to bring said first projection out of a horizontal groove into the vertical groove and rotation in the opposite direction brings the first projection out of the vertical into a horizontal groove.

10. The device of claim 9 in which means are provided for locking the cover on the container, said means being operable to lock the cover when the same is rotated in said one direction.

11. In a lipstick container, a casing for reciprocably receiving a lipstick and serving as a handle for applying the same, means carried by the casing for engaging and urging the stick outward, and a cover including a shaping device removably connected to said casing to receive the end of said stick to prevent its outward movement, said shaping device being operable when in place on the casing whereby it may be actuated to shape the end of the stick as the same is urged outward, means for locking the stick against longitudinal movement whereby the stick is prevented from moving into or out of the casing during application.

12. A container for plastic sticks comprising a cylindrical body, a cover telescoping over said body, the proximate surfaces of the cover and body having interlocking configurations whereby said cover and body are adapted to be locked together by relative rotation, means in the body for holding a stick, spring means for urging said stick holding means upward, means on the stick holding means for engaging the body wall to prevent the upward movement, and means operated by the cover during said relative rotation to release said preventing means, and operated by the cover during opposite relative rotation to lock said preventing means.

13. The device of claim 12 in which means are provided on the inside of the cover for shaping the end of the stick during said rotation.

14. A lipstick container comprising a casing for reciprocably receiving a lipstick, a spring for urging the stick outward, a member adapted to be carried by the stick and cooperating with the casing to prevent outward movement of the stick, and a cover having telescoping engagement with the casing, the proximate surfaces of the casing and cover having an interlocking configuration whereby said cover is adapted to be rotated into and out of locking engagement with the casing, said cover engaging said member when telescoped with the casing whereby to release the member to permit outward movement of the stick when the cover is rotated to locking position and to move the member into locking engagement with the casing when the cover is rotated to unlocking position, said cover consisting of a sleeve and a top rotatably connected thereto whereby when the cover is locked to the casing the top may be turned to shape the end of the stick while the stick is urged outward by said spring.

15. In a container for plastic sticks having a cylindrical casing for receiving a plastic stick and having a spring for urging said stick outward, releasable means for preventing the outward movement, a cover, a sleeve on said cover having telescoping and locking engagement with the casing and engageable with said means when rotated with respect to the casing to simultaneously lock the cover to the casing and unlock the preventing means whereby the plastic stick is moved by the spring into engagement with the inner surface of the cover, said cover being rotatably connected to the sleeve so as to permit shaping the abutting end of the stick by turning the cover.

16. In a container for plastic sticks having an elongated cup-like casing for receiving a plastic stick and having a spring for urging said stick outward, means having releasable engagement with the casing for preventing outward movement of the stick, a cover having an inner stick shaping surface, a sleeve on said cover having telescoping engagement with the casing, and means on the sleeve for engaging and releasing said preventing means during said telescoping engagement to permit the stick to be moved by the spring into abutment with the cover, said cover being rotatably connected to the sleeve so as to permit shaping the abutting end of the stick by turning of the cover.

17. A lipstick container comprising an elongated cup-like casing for receiving a lipstick, a spring in the casing for urging the stick outward, a cover for the casing and having an inner surface for shaping the end of a lipstick, means for locking said cover to the casing, said cover being rotatably connected to said means whereby when locked on the casing it may be turned to shape the lipstick as the same is urged against said surface by the spring.

18. A container for plastic sticks comprising a body having a cylindrical bore for receiving a stick, a spring in the bottom of said bore, a cylindrical sleeve slidable in the bore for holding the base of a stick, a cover for telescoping over the body, said sleeve being urged outward by said spring, a projection on said sleeve, said body having vertically spaced substantially horizontal camming surfaces for engaging said projection to hold the stick at a desired level in the body, means operated by the cover for causing relative rotation of the body and the sleeve to bring the projection into or out of engagement with said surfaces whereby the stick may be locked by the removal of the cover and unlocked by application of the cover.

19. In a lipstick container having a body for slidably receiving a lipstick: a lipstick holder slidably received in said body, a spring in said body for urging said holder outward, means including a series of horizontally projecting teeth and also including a lateral projection on the holder normally engaging a tooth in said series for preventing outward movement of the holder, and a cover for fitting over said container and having unlocking engagement with said locking means whereby said cover when fitted in place on the container, is adapted to engage said means to bring said projection from under said tooth to unlock said holder thereby to allow its outward movement.

20. In a lipstick container having a body for slidably receiving a lipstick and a cover for the body: a lipstick holder slidably received in said body, a spring in the body for urging the holder outward, and means carried by the holder and having locking engagement with the container body for preventing movement of the holder by the spring, said cover having telescoping engagement with the container body and having unlocking engagement with said locking means whereby said cover when fitted in place on the container is adapted to engage said means to unlock said holder and thereby permit its outward movement.

MARY D. KERR.